United States Patent Office 2,992,206
Patented July 11, 1961

2,992,206
OPTICAL BRIGHTENING
Philip V. Youle, John S. M. Robertson, and Joseph C. Robinson, all of Harrogate, England, assignors to Imperial Chemical Industries Limited, London, England, a corporation of Great Britain
No Drawing. Filed Feb. 13, 1959, Ser. No. 792,954
Claims priority, application Great Britain Mar. 14, 1958
4 Claims. (Cl. 260—63)

This invention relates to the optical brightening of fibre and film-forming highly polymeric polymethylene terephthalates.

In our copending U.S. application 699,509, filed November 29, 1957, now abandoned, and Italian Patent 574,566 we describe processes for the optical brightening of fibre and film-forming polymers. In the first application the optical brightening agent is added during the manufacture of the polymer and in the second application the optical brightening agent is copolymerised into the resulting polymer.

In the examples in the specifications of the above applications, the examples relating to the optical brightening of highly polymeric polymethylene terephthalates are shown as having been obtained by the ester-interchange of a dialkyl terephthalate with a glycol, followed by a polycondensation step.

In the commercial manufacture of polyethylene terephthalate, as at present practised, the bis-$\beta$-hydroxyethyl terephthalate which is polycondensed to the polyethylene terephthalate is obtained by the ester-interchange of dimethyl terephthalate with ethylene glycol.

Although the direct esterification of terephthalic acid itself with glycol is known, for example from U.S.P. 2,465,319 the process has been found difficult to operate on the commercial scale for two basic reasons. Firstly the process is a slow one and secondly it is difficult to purify terephthalic acid sufficiently to allow the manufacture of polyethylene terephthalate by this route, which is of a satisfactory colour for fibre and film-forming purposes.

The first disadvantage has been overcome by the use of superatmospheric pressures in the esterification process, this improvement is the subject of our British Patent 777,628.

The second disadvantage has also been largely overcome by the use of purification techniques for terephthalic acid such as described in our British Patent 750,-806.

We have now found that the colour of highly polymeric polymethylene terephthalates, made by the direct esterification of terephthalic acid with glycol, may be further improved by the addition of an optical brightening agent added during the manufacture of the polymer, as described in our copending U.S. application 699,509 and Italian Patent 574,566. The improvement is such as allows fibres, filaments, film and the like of satisfactory colour to be produced commercially from glycol and terephthalic acid which has not been purified to such a marked degree as would be necessary if the optical brightening agent were absent.

According to the present invention we provide a process for the optical brightening of highly polymeric polymethylene terephthalates, particularly polyethylene terephthalate, wherein the highly polymeric polymethylene terephthalate is prepared by reacting terephthalic acid with a glycol of the series $HO(CH_2)_nOH$ where $n$ is 2–10 inclusive, preferably under superatmospheric pressure conditions and polycondensing the esterification product, an optical brightening agent being incorporated in the polyester forming reaction mixture or in the polyester itself. In a preferred form the optical brightening agent contains at least one reactive group which allows copolymerisation with the polymethylene terephthalate.

As optical brightening agents we have found the anthra-$1':9'(N):10'(N):5'$-dipyridazones and anthra-$1':9'(N):10'(N):4'$-dipyridazones, as claimed in our U.S. copending application particularly useful when the agents are added to the polyester forming reactants or incorporated directly in the polymer, such as by melt-blending. For copolymerising with the polyester we have found of value the optical brightening agents based on the above anthradipyridazone structures, particularly those containing one or more groups capable of interaction with one or both members of the group consisting of hydroxyl and carboxylic acid groups, as claimed in our copending U.S. application 699,509.

The following examples, in which all parts and percentages are by weight, illustrate but do not limit the scope of our invention.

*Example 1*

1328 parts terephthalic acid and 976 parts of ethylene glycol were reacted over 90 minutes in the presence of 0.33 part calcium oxide, 6.64 parts titanium dioxide, 0.51 part antimony oxide and 0.77 part 2.8-di (2:6 dimethyl phenyl) - anthra - $1':9'(N):5':10'(N)$ - dipyridazone.

The temperature range used was 200–250° C., water being bled continuously from the autoclave wherein pressure was kept at 40 p.s.i.g. until the calculated amount of water was removed. Polycondensation of the product was then carried out over 90 minutes at 275° C. and 0.4 mm. Hg pressure.

The resultant polymer was of excellent colour and had an I.V. (1%, O-chlorophenol, at 25° C.)=0.62 and softening point=262° C.

It readily yielded cold drawable filaments having a bluish fluorescence in ultra-violet light, which in daylight imparted a useful optical brightening effect to enhance appearance.

*Example 2*

The procedure described in Example 1 was repeated except that the optical brightening agent was added at the end of esterification but prior to polycondensation.

The resultant polymer was again an excellent white colour and had an I.V.=0.61 (1% o-chlorophenol at 25° C.) and a softening point=262° C. Filaments made by melt spinning exhibited a similar optical brightening effect to that described in Example 1.

By comparison if the optical bleaching agent is omitted from the polyester forming reactants in the foregoing examples, the resulting polyethylene terephthalate, which has a softening point 262° C. and I.V. (1%, o-chlorophenol at 25° C.) 0.64, is of much less attractive colour. This colour difference is even more marked when the polyesters are melt spun to give fine filaments for textiles purposes.

In Examples 1 and 2 terephthalic acid of good quality prepared by saponification of dimethyl terephthalate was used. Example 3 utilises terephthalic acid made by the air oxidation of p-diisopropyl benzene in acetic acid solvent, which had received no rigorous purification.

*Example 3*

996 parts of terephthalic acid and 550 parts of ethylene glycol were reacted, over 100 minutes in the presence of 0.30 part calcium oxide, 0.40 part antimony oxide, 4.98 parts titanium dioxide and 0.50 part of 2:8 di-(2:6 dimethyl phenyl) - anthra - $1':9'(N):5':10'(N)$ - dipyridazone.

The temperature range used was 200–250° C. and water was bled continuously from the autoclave wherein pressure was kept at 40 p.s.i.g., until the calculated amount of water was removed. Polycondensation of the product was then carried out over 100 minutes at 275° C. and 0.4 mm. Hg pressure.

The resultant polymer had an I.V. (1%, o-chlorophenol at 25° C.)=0.59 and a softening point of 257.6° C. It was noticeably less yellow than a polymer, which had an I.V. (1%, o-chlorophenol at 25° C.)=0.56 and a softening point of 257.9° C. made under identical conditions but in the absence of an optical brigthening agent.

*Example 4*

A quantity of polyethylene terephthalate was prepared according to the procedure of Example 1 but omitting the incorporation of optical brightening agent. 100 parts of this polymer were chipped then tumbled for one hour with 0.05 part 2:8 di-(2:6 dimethyl phenyl)-anthra-1':9'(N):5':10'(N)-dipyridazone before melt spinning at 285° C. The optical whitening agent adhered readily and evenly to the polymer chip and the spun filaments were of much improved appearance compared to those obtained in a comparative experiment carried out without the whitening agent.

*Example 5*

The procedure described in Example 2 was repeated except that the whitening agent 2:8-di(2-methyl 6-hydroxymethyl phenyl)-anthra-1':9'(N):5':10'(N)-dipyridazone was used. This agent was copolymerised with the polyethylene terephthalate by addition at the polycondensation stage. The resultant polymer was of excellent colour, being white with a useful blue hue. It had an I.V.=0.74 (1%, o-chlorophenol at 25° C.) and a softening point=261.7° C.

The polymer was melt spun to give fibre of excellent colour and more attractive than that in which the optical bleaching agent was omitted.

*Example 6*

996 parts of terephthalic acid, made by the bromine-assisted air oxidation of p-xylene and which was not extensively purified other than by crystallisation from water, was reacted over 90 minutes with 550 parts of ethylene glycol, in the presence of 0.05 part sodium hydroxide, 0.40 part antimony oxide and 2.98 parts titanium dioxide. This esterification was carried out in the manner described in Example 1. After esterification was complete 0.35 part of phosphorous acid was added and polycondensation of the product was carried out over 80 minutes at 285° C. and 0.4 mm. Hg pressure.

The resultant polymer had an I.V. (1% in o-chlorophenol at 25° C.)=0.713 and a softening point of 261.2° C. 100 parts of this polymer were chipped and then tumbled with 0.05 part 2:8 di-(2:6 dimethyl phenyl)-anthra-1':9'(N):5':10'(N)-dipyridazone before melt spinning at 285° C. The spun filaments were of much improved appearance compared to those obtained in a comparative experiment carried out without the whitening agent.

*Example 7*

The procedure described in Example 1 was repeated except that 0.5 part antimonic acid was used in place of 0.4 part antimony trioxide as a polycondensation catalyst. The resultant polymer was of excellent colour and had an I.V. (1% o-chlorophenol at 25° C.)=0.704 and softening point of 261.3° C. Filaments made by melt spinning exhibited a similar optical brightening effect to that described in Example 1.

What we claim is:

1. The improved process for the production of optically brightened fiber- and film-forming polymethylene terephthalates comprising esterifying terephthalic acid with a glycol of the series $HO(CH_2)_nOH$, wherein $n$ is an integer having a value from 2 to 10 inclusive, polycondensing the esterification product, and adding a small amount of an optical brightening agent selected from the group consisting of 2:8 di(2:6 dimethyl phenyl)-anthra-1':9'(N):5':10'(N) - dipyridazone and 2:8-di(2 methyl 6-hydroxy-methyl phenyl)-anthra-1':9'(N):5'10' (N)-dipyridazone, during the period of commencing prior to the esterifying and before the polyester is shaped into its final form.

2. A process according to claim 1 wherein the 2:8-di(2 methyl 6-hydroxymethyl phenyl)-anthra-1':9'(N):-5'10'(N)-dipyridazone is added prior to polycondensing, and is copolymerized with said esterification product.

3. An optically brightened fiber- and film-forming polymethylene terephthalate prepared according to the process of claim 1.

4. A process according to claim 1, wherein the optical brightening agent is 2:8 di(2:6 dimethyl phenyl)-anthra-1':9'(N):5':10'(N)-dipyridazone.

References Cited in the file of this patent

UNITED STATES PATENTS 2,571,319    Waters et al. _____ Oct. 16, 1951